United States Patent [19]

Moore

[11] 3,774,576
[45] Nov. 27, 1973

[54] ANIMAL, BIRD OR LIKE CAGE

[76] Inventor: Charles T. Moore, 447 Highland Ave., Chambersburg, Pa. 17201

[22] Filed: Aug. 23, 1971

[21] Appl. No.: 174,042

[52] U.S. Cl. .................... 119/17, 119/18, 119/23
[51] Int. Cl. .................. A01k 01/00, A01k 31/00
[58] Field of Search .............. 119/17, 18, 19, 15, 119/23; 46/19, 30, 31

[56] References Cited
UNITED STATES PATENTS

| | | | |
|---|---|---|---|
| 1,358,119 | 11/1920 | Shrock | 119/23 |
| 311,793 | 2/1885 | Stranders | 46/19 |

Primary Examiner—Hugh R. Chamblee
Attorney—Charles J. Diller et al.

[57] ABSTRACT

This disclosure relates to an animal cage which is rapidly assembled or disassembled without the use of fasteners or tools, and includes a plurality of floor panels in superimposed relationship defining between each pair a chamber with associated side and end panels, aligned apertures at corners of the floor panels, a plurality of posts interconnected to each other through the apertures, the posts each including a pair of channels which snugly receive one or more immovable panels and at least one movable panel (one or all of which may be transparent), and the movable panel being in alignment with a slot opening through each floor panel whereby access to any of the chambers is readily accessible by simply sliding one or more of the movable panels through the associated floor panel slots. The cage further includes openings through which animals may pass and rim means projecting above each opening for preventing debris from falling therethrough.

22 Claims, 9 Drawing Figures

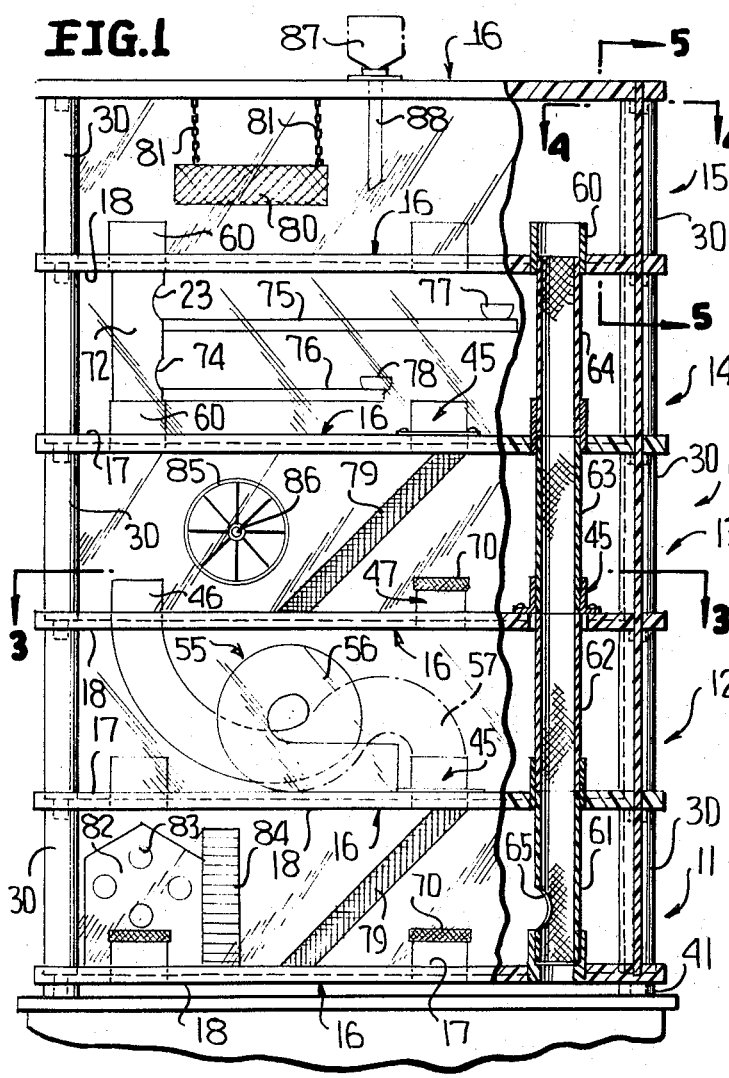
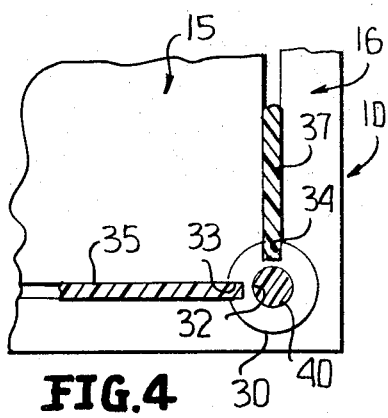
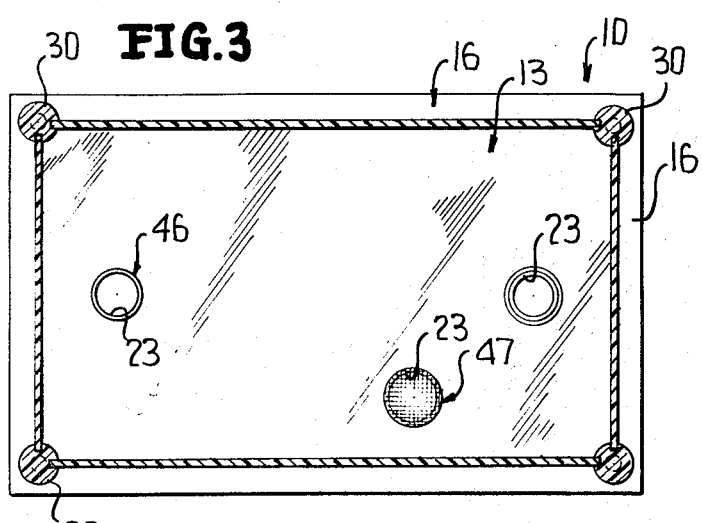
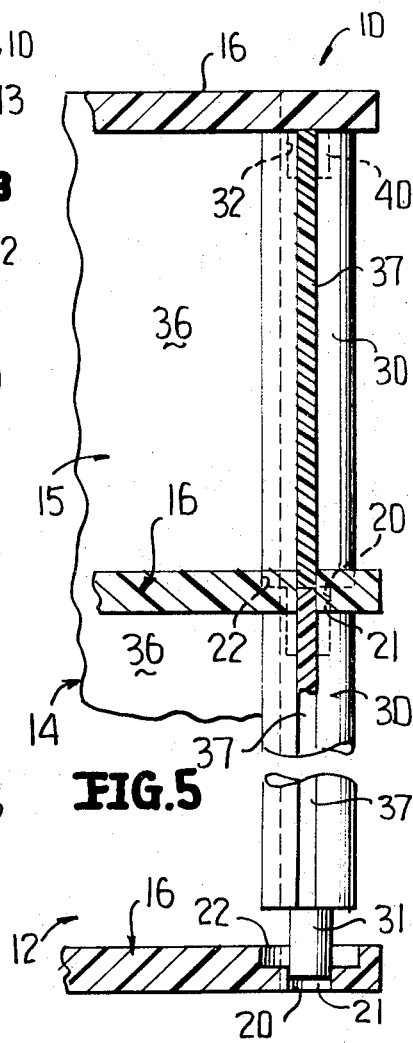
INVENTOR
CHARLES T. MOORE

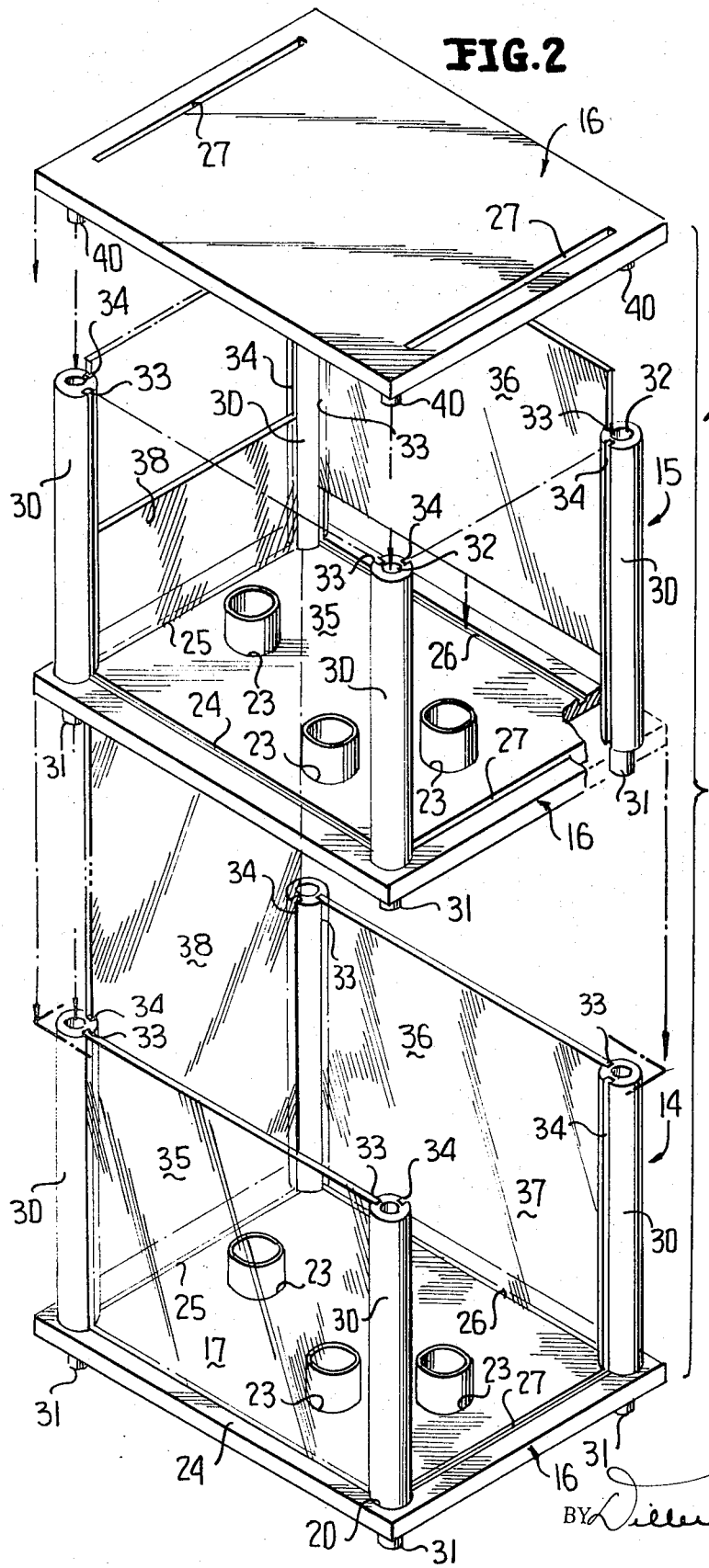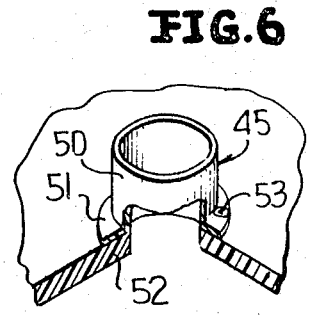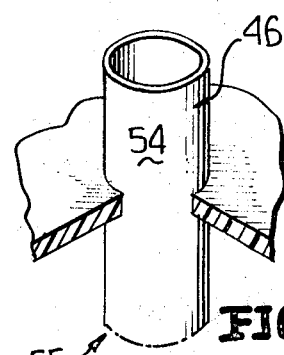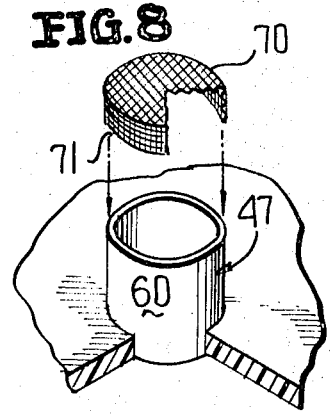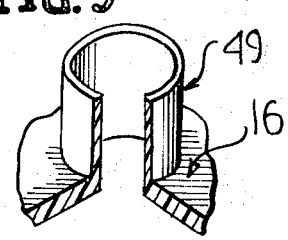

ANIMAL, BIRD OR LIKE CAGE

It is well known that small animals are kept in cages as pets as, for example, gerbils, hamsters, etc., and these and similar animals are additionally useful in medical research. Gerbils were initially introduced into the United States for medical research but their traits soon suggested to laboratory workers a stronger potential value as pets for which they are now more basically used because of their natural friendliness and acrobatic antics.

Unfortunately, the very high cost of breeding and raising gerbils or similar animals to a salable age dictates a retail price much higher than prices for other similar animals, and as a result, breeders have been unable to reach an adequate sales volume at a profitable price. One solution to this problem is, of course, volume sales which is directly related to an appreciation of the characteristics of gerbils which is again directly related to the manner in which gerbils or similar animals are displayed in pet shops for observance by potential purchasers.

The cage of the present invention was developed to best exhibit to the public the beauty, personality and activity of such animals while at the same time permitting customers to additionally purchase the cage at a nominal price due to its simplicity of construction, design, assembly and disassembly. As will be noted hereinafter, the cage of this invention constitutes an appreciable advance in such conventional viewing chambers such as fish aquariums, wire cages, etc., which essentially limit an animal to a single level (floor) of activity except perhaps for bird perches in specifically designed bird cages. More specifically, with the present cage various levels are in stacked relationship which is most desirable because of the natural tendency of gerbils and hamsters to climb, burrow, and instinctively explore any area accessible through an opening. Thus, by providing openings between floor panels of the present cage accessible by ladders, transparent passages, etc., the natural activities of the animals can be readily observed.

One additional difficulty of prior art cages constructed of wire is, of course, the limited view afforded an animal lover due to the very fact that the cage is constructed from numerous contiguous wires. Moreover, accessibility is limited generally to but a single sliding or swinging door. These deficiencies are overcome in the present invention by constructing all or fewer than all end and side panels from transparent material and by novel channel and slot arrangements permitting any chamber of a superimposed number of chambers or levels to be readily opened simply by sliding its associated panel vertically through a slot in an overlying floor panel.

Perhaps one of the most important features of the present invention is its ease of assembly and disassembly due to novel posts, slot and groove connections whereby if purchased it can be carried home by the purchaser in unassembled or knocked down form yet can be rapidly assembled thereby avoiding the oft seen cumbersome manner in which cages and their occupants are transferred by purchasers from pet shops to homes. Due to this invention, if an animal is purchased contemporaneously with the cage, the animal can be temporarily housed in an extremely small container which in the case of a gerbil could be small enough to fit in one's pocket. Yet, this could be done with the assurance that no harm would come to the animal due to the rapid assembly of the cage of this invention by even the most nonmechanically inclined and uninitiated in cage or similar structures.

In keeping with the foregoing, it is a primary object of this invention to provide a novel animal, bird or similar cage which preferably includes but is not limited to the following advantages:

a. The cage can be rapidly assembled and disassembled without the use of conventional separate fasteners and/or tools.

b. Novel through slots in floor panels permit movable side or end panels to be slid upwardly or downwardly to gain access to any particular level of the cage in a rapid fashion and with the assurance that animals cannot escape the remaining nonopened levels or chambers.

c. The rapid disassembly and assembly referred to in paragraph *a* is also united with the ease of accessibility of paragraph *b* by additionally providing corner posts with pairs of axially extending channels which in conjunction with grooves in floor panels permit side and/or end panels to be rigidly interconnected between adjacent posts and floor panels.

d. Due to the multi-level construction of the cage rim means are provided projecting above openings through the floor panels to prevent debris from falling therethrough to a next lower level or chamber, the rim means being either an integral molded portion of the floor panel, a separate rim associated with an opening of the floor panel, or a tubular animal passageway inserted into and through a floor panel opening such that its projecting end portion constitutes the rim means for preventing debris from passing between levels.

e. The rim means, be they separate rim or the projecting end portion of the passge, is as might be desired sealed or closed by a cap which will prevent communication between chambers or levels, as well as providing seats for the little animals.

With the above and other objects in view that will hereinafter appear, the nature of the invention will be more clearly understood by reference to the following detailed description, the appended claimed subject matter, and the several views illustrated in the accompanying drawings.

IN THE DRAWINGS

FIG. 1 is a front elevational view of a novel multi-level cage constructed in accordance with this invention with portions thereof broken away for clarity, and illustrates the manner in which various levels of the cage are interconnected by posts and panels in the absence of conventional fasteners.

FIG. 2 is an exploded perspective view of the top two levels of the cage of FIG. 1, with certain components removed for clarity, and more particularly illustrates the manner in which two end panels of each chamber or level can be slid through slots thereof to gain access to any particular chamber interior.

FIG. 3 is a sectional view taken generally along line 3—3 of FIG. 1, and illustrates several different type rim means projecting through openings of a floor panel for preventing debris from falling to the next lower level.

FIG. 4 is a highly enlarged fragmentary cross-sectional view taken generally along line 4—4 of FIG. 1, and illustrates the manner in which each post has a pair of axially extending channels for receiving edges of movable and/or immovable panels.

FIG. 5 is a fragmentary enlarged sectional view taken generally along line 5—5 of FIG. 1, and illustrates more specifically the manner in which each floor panel is provided with bored and counterbored apertures with axially aligned posts being secured together therethrough.

FIGS. 6, 7, 8 and 9 are enlarged fragmentary perspective views with portions thereof broken away and shown in section for clarity, and illustrate respectively four ways of providing rim means in accordance with this invention to prevent debris from falling from one level or chamber to another.

A novel animal, bird or like cage constructed in accordance with this invention is generally designated by the reference numeral 10 and, as best illustrated in FIG. 1, is composed of a plurality of levels or chambers 11 through 15 which will hereinafter be provided with like reference numerals for identical structure.

Referring more particularly to FIGS. 1, 2 and 3, each of the chambers 11 through 15 is defined by a generally polygonally shaped floor panel 16 having an upper surface 17 and a lower surface 18. At each corner (unnumbered) of each floor panel is provided aperture means 20, which as is best illustrated in FIG. 5 includes a cylindrical bore 21 and a larger cylindrical axially aligned counterbore 22. One or more circular openings 23 are also formed in each floor panel 16, as are three upwardly opening groove means 24, 25, 26 and slot means 27. The groove means 24, 25 and 24, 26 merge with or at the aperture means 20 at one end or side of each floor panel while the groove means 24, 26 likewise merge with the slot means 27 at the opposite aperture means 20. It is to be particularly noted that the groove means or grooves 24, 25 and 26 do not pass completely through the bottom surface 18 of the floor panels 16, but merely pass through the upper surfaces 17 thereof, whereas the slot means 27 of all the floor panels 16 pass completely through the same between the surfaces 17, 18.

Received within each aperture means 20 is a cylindrical post 30 having a reduced lower terminal end 31 (FIG. 5) and an upper end portion provided with a cylindrical bore 32. The lower end portion (unnumbered) of each post 30 above its reduced terminal end 31 is of a diameter to snugly seat in the counterbore 22 whereas the diameter of the terminal end 31 is received in each bore 21 and in the lower axial bore 32 of a lower post 30, as best shown in FIG. 5. Thus, the various levels or chambers 11 through 15 are supported and interlocked by an upper post being seated within each bore 21 and its associated counterbore 22 while an uppermost end portion (unnumbered) of each post 30 receives therein the terminal end 31 of an overlying post which additionally seats in the bores and counterbores 21, 22 (FIG. 5).

Each post 30 additionally includes axially extending channels 33, 34 which are disposed with the planes thereof offset 90° relative to each other whereupon adjacent posts have channels 33, 33 or 34, 34 in opposing relationship to each other.

Side panels 35, 36 and end panels 37, 38 are seated in the channels 33 and/or 34 in the manner best illustrated with respect to the chamber 14 of FIG. 2. Though the panels 35, 36 have been termed side panels and the panels 37, 38 have been termed end panels, these terms "side" and "end" have been employed for reference and are considered equivalents. Thus, considering first the panel 35, this panel is snugly received in the upwardly opening groove 24 of each chamber and in grooves 33, 33 of the post 30 associated therewith, once again as is best illustrated relative to the chamber or level 14 of FIG. 2. Likewise, the panel 36 is snugly seated within the upwardly opening groove 26 and the grooves 33, 33 of the associated posts 30. The panel 38 is similarly seated with its lower edge (unnumbered) snugly in the upper reopening groove 25 while side edges thereof are received in the grooves 34, 34 of the associated posts 30. Finally, the panel 37 of each level 11 through 15 is slidingly received in the grooves 34, 34 of the associated posts 30 and in alignment with the slot 27 thereof. One major feature of this invention is the fact that each of the panels 37 can slide through the slot 27 of its associated level 11 through 15 or for that matter through any of the remaining slots 27 and the grooves 34, 34 of the posts 30, 30 adjacent the slots 27 to function in a manner which will be best appreciated from FIG. 1, it being noted that the uppermost "floor" panel which is the top panel of the cage 10 is likewise provided with at least one slot 26 through the surfaces 17, 18 thereof in alignment with the remaining slots 27 of the remaining floor panels of the levels. Assuming, for example, that one desires to gain access to the chamber or level 15, it is only necessary to push the panel 37 of this level upwardly. More importantly, if it were desired to gain access to the lowermost level 11, one would merely push the lower panel 37 of the level 11 upwardly for, let us assume, one-half its vertical dimension which would in turn raise each panel 37 of the remaining levels 12 through 15 an identical distance thereby maintaining the chambers 12, 15 completely closed though permitting access to the lower chamber of level 11.

Though the cage 10 has been described with but a single slot 27 preferably formed in the floor panels 16 of all of the levels 11 through 15, it is to be understood that in accordance with this invention the upwardly opening slot or groove 25 of each of the floor panels 16 may be formed with a slot corresponding to the slot 27, as is illustrated by the uppermost "floor" or top panel 16 of the level 15. This would permit both opposite end (or side) panels to be slid vertically through the floor panels in the manner heretofore described to gain access to the various levels 11 through 15. The top panel 16 also may have a screened area (not shown) for ventilation purposes.

In order to rigidly secure the upper end of the cage 10, the top panel 16 is provided with downwardly depending cylindrical pegs or legs 40 of a cylindrical cross section sufficient to snugly fit within the axial bores 32 of the uppermost post 30. Furthermore, rather than provide posts of different bottom contours, the end 31 of the lower posts which project beneath the floor panel 16 of the lowermost level 11 are surrounded by annular sleeves 41 whose bottom faces are flush with the bottom ends of the terminal ends 31 of each post 30. In this manner the lowermost floor panel 16 of the lowermost level 11 cannot drop downwardly, as is readily apparent from FIG. 1, which would otherwise occur in the absence of such sleeves 41 or equivalent structure.

As was heretofore noted, each of the floor panels 16 and, if desired, the uppermost top panel 16 of the level 15, are provided with the circular openings 23 which provide communication between the levels 11 through 15. However, it is obviously undesirable for debris from one chamber to drop through the openings 23 into a next subjacent chamber, and accordingly this disadvantage is overcome by providing rim means 45, 46 and 47 shown best in FIGS. 6 through 8, respectively.

The rim means 45 is simply a cylindrical sleeve 50 of metal or plastic having a flange 51 provided with one or more openings 52 through which pass screws 53 for securing the rim means 45 in coaxial relationship 21 of the openings 23 of the various panels 16. As an alternate construction the sleeve 50 could simply be an integrally formed or molded part of the floor panels 16.

Another of the rim means 46 is simply an end portion 54 of a transparent tubular passage 58 (FIGS. 1 and 7) which is force fit through the opening 23 associated therewith in the floor panel 16 of the level 13. Inasmuch as the end portion 54 projects above the level of the associated floor panel 16, debris cannot pass between the chambers 13, 12. The passage 55 is not only transparent but preferably the interior thereof is provided with wire or like material which will provide a foothold for the animals and centrally thereof is a loop 56 to display the small animals' acrobatic tendencies. Insofar as the opposite end portion 57 of the passage 55 is concerned, this end may simply be inserted into another of the rim means 45, or simply inserted in the opening 23 associated therewith in the absence of the rim means 45, or inserted into the rim means 47 (FIGS. 1 and 8) which is likewise another metallic or plastic sleeve 60 having an outer surface which can be force fit into the openings 23 for receipt therein of one or more animal passageways, such as the loop passageway 55, or shorter stacked transparent passageways 61 through 64 (FIG. 1) likewise provided with an interior gripping surface and any one or more which may be provided with openings, as at 65 in the passageway 61. Moreover, in the event it is undesired to have communication between any particular two or more of the various chambers 11 through 15 by an animal, a plastic or wire mesh cap 70 is provided which has a peripheral skirt 71 of sufficient flexibility to be placed in external telescopic relationship to any of the rim means 45, 46, 47, or in internal telescopic relationship thereto, or simply pushed into any of the openings 23 which may not be provided with any of the rim means 45 through 47. However, in the preferred embodiment of the invention each floor panel 16 would be identical and would have formed or integrally molded therein three rimmed openings, with one such opening 49 being shown in FIG. 9.

Another transparent passage means 72 with wire or similar internal animal foothold means is provided with a pair of openings 73, 74 above respective rims 75, 76 carrying feeding trays 77, 78, respectively. The passageway 72 thereby functions as a "tree trunk" which is internally accessible from the levels 14, 15 and could as well be accessible from the level 13, it being noted that the passage 72 is simply inserted in rim means 60 which are in turn force fit in openings 23.

In order to additionally demonstrate to potential customers other devices are provided as, for example, a wire or screen walkway 79 between levels 11, 12 and 13, 14 with the walkways being secured in a conventional manner in the positions illustrated. A rotatable exercise wheel 85 is mounted for rotation on a shaft 86 which is in turn secured by a suction cup (not shown) to any one of the panels 35 through 38.

A tubular wire or plastic mesh "swing" 80 may be suitably suspended by chains 81 to provide additional exercise, as is a small house 82 having openings 83 with the interior of the house being in communication with a transparent tubular chimney 84, the latter of which may be constructed as one of the passageways 61 exiting the chamber 11 and entering the chamber 12 through one of the openings 23.

A conventional watering container 87 may be supported atop the cage with its metal feed tube 88 projecting into the upper chamber 15 at a height accessible to the animals.

From the foregoing it is believed amply apparent that the cage 10 can be readily assembled and disassembled, sold in either form, and sold either as a complete unit or by the individual levels thereof. For example, assuming that the cage 10 were actually set up in a pet shop in the manner illustrated in FIG. 1 and that a customer desired to purchase levels 13 through 15 intact and assembled, it would be a relatively simple proposition to remove these levels en masse with or without animals therein. One person would merely grasp the bottom panel 16 of the level 13 and the sliding panel 37 thereof and lift off the levels 13 through 15 upwardly. A second person would disconnect the end portion 46 of the passage 55 and the end portion (unnumbered) of the passage 63 and recover the top of the level 12 with another bottom (top) panel. Moreover, it should be readily apparent that it is equally as easy to remove an intermediate one of the levels from the remainder thereof.

In order to further simplify the manufacture and assembly or disassembly of the cage 10, the nonsliding panels 35 and 36 and the associated posts 30, 30 and 30, 30 could be molded each as one piece.

While preferred forms and arrangements of parts have been shown in illustrating the invention, it is to be clearly understood that various changes in details and arrangement of parts may be made without departing from the spirit and scope of this disclosure.

I claim:

1. An animal, bird or like cage comprising a first floor panel and a second floor panel thereabove in part defining a chamber, a plurality of aligned aperture means in said first and second floor panels, a plurality of posts having upper and lower end portions, said upper and lower post end portions being aligned with an adjacent aperture means of said second and first floor panels respectively, at least one end portion of each post being received within an associated aperture means of one of said first and second floor panels, axially extending channel means in said posts opening toward each other, a movable panel having edges thereof slidingly received within said channel means, and slot means through one of said floor panels in the plane of said movable panel whereby said movable panel may be moved through said slot means to gain access to said chamber.

2. The cage as defined in claim 1 including openings in said first and second floor panels through which animals may pass, and rim means projecting above each opening for preventing debris from falling therethrough.

3. The cage as defined in claim 1 including openings in said first and second floor panels through which animals may pass, and tubular passage means extending between and projecting into said openings.

4. The cage as defined in claim 1 including openings in said first and second floor panels through which animals may pass, and tubular passage means extending between said openings and projecting upwardly through and beyond the opening of said second floor panel thereby defining rim means additionally functioning to prevent debris from falling through said passage means from said second floor panel to said first floor panel.

5. The cage as defined in claim 1 wherein said one end portion of each post and said lower end portions are one and the same.

6. The cage as defined in claim 1 including an immovable panel also in part defining said chamber, said immovable panel being sandwiched between said first and second floor panels, and one of said floor panels having an outwardly opening groove receiving an edge of said immovable panel.

7. The cage as defined in claim 1 wherein said one end portion of each post and said lower end portions are one and the same, each post lower end portion has a reduced terminal end, and each post upper end portion has a bore of a size to receive said reduced terminal ends.

8. The cage as defined in claim 1 wherein the aperture means of said first and second floor panels are each defined by a bore and a counterbore.

9. The cage as defined in claim 1 wherein said first and second floor panels each have upper and lower surfaces, and said aperture means are each defined by bores opening through said lower surfaces and counterbores opening through said upper surfaces.

10. The cage as defined in claim 1 including openings in said first and second floor panels through which animals may pass, rim means projecting above each opening for preventing debris from entering each opening directly from its associated floor, and means closing each opening to prevent debris from indirectly entering each opening so closed.

11. A set of components for assembling an animal, bird or like cage without conventional fasteners or tools comprising a plurality of floor panels, at least one of said floor panels having outwardly opening groove means and slot means collectively defining a chamber outline, said slot means opening completely through said one floor panel, a plurality of posts, said posts each having at least one axially extending channel, means for joining said posts to said floor panels in the absence of separate conventional fasteners, at least one movable panel dimensioned for passage through slot means and interiorly along said channel means, and at least one immovable panel dimensioned for receipt in said groove means whereby a predetermined number and placement of said components will effectively create a multi-leveled cage.

12. The assembly as defined in claim 11 wherein said one floor panel has bored and counterbored aperture means for receiving like contoured terminal ends of said posts.

13. The assembly as defined in claim 11 wherein said groove means and slot means collectively set off a generally polygonal outline, and said joining means are each in part defined by an aperture at adjacent sides of the polygonal outline.

14. The assembly as defined in claim 11 wherein said joining means are defined in part by opposite ends of said posts, one end of each post having an axial bore, and the other end of each post having a reduced terminal end of a size adapted for receipt in said bores.

15. An animal, bird or like cage comprising a first floor panel and a second floor panel thereabove in part defining a chamber, a plurality of aligned aperture means in said first and second floor panels, a plurality of posts having upper and lower end portions, at least one end of each post being received in an aperture means of at least one of said first and second floor panels, groove means in a surface of one of said floor panels opening outwardly toward the other of said floor panels, each post having at least a pair of axially extending channel means with the channel means of adjacent posts opening toward each other and being in alignment with said groove means, and a panel having edges snugly received in the channel means of adjacent posts and the groove means therebetween and one of said groove means is a through slot with the panel associated therewith being dimensioned to pass therethrough.

16. An animal, bird or like cage comprising chamber means for confining an animal or the like including a first floor panel and a second floor panel thereabove in part defining a chamber, a plurality of posts, means connecting said posts between said first and second floor panels, axially extending channel means in said posts opening toward each other, said chamber means further including at least a single movable panel having edges thereof slidingly received within said channel means, and slot means through one of said floor panels in the plane of said movable panel whereby said movable panel may be moved through said slot means to gain access to said chamber.

17. The cage as defined in claim 16 wherein said first and second floor panels include a plurality of aligned aperture means, said posts have upper and lower end portions, said aperture means are bored and counterbored, and at least some of said post ends are contoured to and received in said bored and counterbored apertures.

18. An animal, bird or like cage comprising first chamber means for confining an animal or the like and a second chamber means for confining an animal or the like positioned thereabove, said first and second chamber means include respective upper and lower panels, an aperture in each of said panels, a flange projecting above said lower panel of said second chamber means contiguous the aperture therein whereby debris is precluded from falling through said last-mentioned aperture from said second chamber means to said first chamber means, and tubular passage means extending between and interconnecting said first and second chamber means through said apertures provided in said upper and lower panels with said passage means being internally telescoped within at least said flange on said lower panel, whereby an animal may have access to the respective chamber means.

19. The cage as defined in claim 18 wherein said passage means is tubular, vertically upright and transparent.

20. The cage as defined in claim 18 wherein said passage means is also internally telescoped within said upper panel aperture of said first chamber.

21. The cage as defined in claim 20 wherein said passage means is tubular, vertically upright and transparent.

22. The cage as defined in claim 20 including a water feeder having a vertically disposed feeder tube.

* * * * *